United States Patent [19]

Macomber

[11] Patent Number: 5,913,071
[45] Date of Patent: Jun. 15, 1999

[54] SCALAR INTERRUPT-ACKNOWLEDGEMENT SYSTEM THAT RESPONDS TO A PLURALITY OF EVENTS WITH A SINGLE INTERRUPT SIGNAL

[75] Inventor: Robert Macomber, Portland, Me.

[73] Assignee: National Semiconductor Corporation, Santa Clara, Calif.

[21] Appl. No.: 08/097,438

[22] Filed: Jul. 26, 1993

[51] Int. Cl.[6] .................................................... G06F 13/00
[52] U.S. Cl. ...................... 395/800.4; 395/835; 395/733
[58] Field of Search .................................... 395/800, 775, 395/575, 550, 325, 200; 371/5.3, 8.2, 9.1, 11.2, 11.3, 67.1, 68.2, 68.3; 370/60, 53

[56] References Cited

U.S. PATENT DOCUMENTS

| 4,096,564 | 6/1978 | Inose et al. | 395/725 |
| 4,393,470 | 7/1983 | Miard | 395/775 |
| 4,517,643 | 5/1985 | Bannai | 395/725 |
| 4,851,987 | 7/1989 | Day | 395/550 |
| 5,313,622 | 5/1994 | Truchard et al. | 395/550 |
| 5,315,580 | 5/1994 | Phaal | 370/13 |

FOREIGN PATENT DOCUMENTS 0 029 394  5/1981  European Pat. Off. .

OTHER PUBLICATIONS

IBM Technical Disclosure Bulletin, "Independent Interrupt Triggering by Timer Signal", vol. 34, No. 10B, Mar. 1992, New York, US, p. 250.

1991 National Semiconductor Data Sheet for the DP83265. Specifically, see p. 2–282.

Primary Examiner—Alpesh M. Shah
Attorney, Agent, or Firm—Limbach & Limbach L.L.P.

[57] ABSTRACT

A peripheral device and a host device implement a scalar interrupt-acknowledgement system. The peripheral device detects events and increments an unprocessed counter in response to each detected event. The host device processes the events and increments a processed counter in response to each processed event. After a number of events have been processed, the host device transmits the value held by the processed counter to the peripheral device. In response, the peripheral device subtracts the value of the processed counter from the value of the unprocessed counter. The peripheral device asserts an interrupt when events remain to be processed and deasserts the interrupt when all the events have been processed.

16 Claims, 10 Drawing Sheets

SCALAR INTERRUPT-ACKNOWLEDGEMENT SYSTEM THAT RESPONDS TO A PLURALITY OF EVENTS WITH A SINGLE INTERRUPT SIGNAL

BACKGROUND OF THE INVENTION

1. Field of the Invention.

The present invention relates to data processing systems and, in particular, to an interrupt-acknowledgement circuit that generates a single interrupt signal when a plurality of events are detected and that allows a host device to process all of the detected events without delayed processing, spurious interrupts, or additional overhead.

2. Description of the Related Art.

When a peripheral device regularly detects events which are processed by a host device, a simple interrupt-acknowledgement protocol can be utilized to define the communications between the peripheral device and the host device. Under a simple interrupt-acknowledgement protocol, the peripheral device typically detects a single event, generates a single interrupt signal in response to the detected event, and then ignores subsequent events until the interrupt signal is acknowledged by the host device (i.e., the host device modifies a register on the peripheral device).

Upon receiving the interrupt signal, the host device typically processes the event and then acknowledges the interrupt signal, thereby enabling the peripheral device to detect the next event. FIG. 1 shows a timing diagram which illustrates the operation of the host device and the peripheral device under a simple interrupt-acknowledgement protocol.

The detection of a series of events by the peripheral device is represented in FIG. 1 by a series of event pulses 10 where the falling edge 12 of each event pulse 10 represents the detection of a complete event. As shown in FIG. 1, the peripheral device generates the rising edge 14 of an interrupt signal $V_I$ in response to the falling edge 12 of a detected event.

The processing of each event 10 by the host device is represented in FIG. 1 by a series of processing pulses 16. As further shown in FIG. 1, the host device begins processing each event 10 a leading delay time T1 after the rising edge 14 of the interrupt signal $V_I$ is generated. The host device completes the processing of the event 10 and then generates an acknowledgement signal $V_A$ which is received by the peripheral device a trailing delay time T2 after the event has been processed, thereby causing the interrupt signal $V_I$ to be deasserted. The leading and trailing delay times T1 and T2 can represent, for example, the time required to communicate with the peripheral device via a bus.

While the relationship between the event, the interrupting signal, and the acknowledgement signal are well defined and robust, the simple interrupt-acknowledgement protocol is not very practical in environments where the events are received in bursts instead of being regularly spaced as shown in FIG. 1.

When events are received in bursts, as is the case with the network interface device of a local area network, a peripheral device which, as stated above, ignores intervening events can potentially lose all of the data packets transmitted while the interrupt signal is asserted.

To avoid a potential loss of data, most modern network interface devices utilize a many-to-one mapping protocol which allows the network interface device to receive multiple packets from the network. Under a process-then-acknowledge many-to-one protocol, the peripheral device typically detects a burst of packets and then generates a single interrupt signal in response to the first packet detected.

Upon receiving the interrupt signal, the host device typically processes all of the packets detected by the network interface device and then acknowledges the interrupt signal. FIG. 2 shows a timing diagram which illustrates the operation of the host device and the network interface device under a process-then-acknowledge many-to-one protocol.

The detection of a burst of packets by the network interface device is represented in FIG. 2 as a series of packet pulses 20 where the falling edge 22 represents the detection of a first complete packet. As with the peripheral device, the network interface device generates the rising edge 24 of an interrupt signal $V_{II}$ in response to the falling edge 22 of the first detected packet.

The processing of each packet 20 by the host device is represented in FIG. 2 by a series of packet processing pulses 26. As shown in FIG. 2, the host device processes all of the packets 20 detected by the network interface device and then acknowledges the interrupt signal $V_{II}$ the trailing delay time T2 after the last packet is processed.

The principal disadvantage of the process-then-acknowledge many-to-one protocol as described above is the occurrence of a delayed notification condition between the host device and the network interface device. A delayed notification condition occurs when the host device completes the processing of all the packets detected by the network interface device at approximately the same time that the network interface device detects a new packet.

FIG. 3 shows a timing diagram which illustrates a delayed notification from the network interface device to the host device under a process-then-acknowledge many-to-one protocol. As shown in FIG. 3, the burst of packets 20 are represented by a first packet 28, a second packet 30, and a third packet 32. Further, the processing of the first packet 28 is represented by a first packet pulse 34 while the processing of the second packet 30 is represented by a second packet pulse 36.

As further shown in FIG. 3, the host device completes the processing of the second packet 30 and during the trailing delay time T2, while the host device is transmitting an acknowledgement signal to the network interface device, the network interface device detects the third packet 32. The presence of the third packet 32 goes undetected because the interrupt signal $V_{II}$ is still asserted during the trailing delay time T2. Thus, since the third packet 32 has gone undetected, the third packet will remain stored in the network interface device until the next packet is detected and the interrupt signal $V_{II}$ is reasserted.

One solution to the problem of delayed notification is to recheck the network interface device each time the host device completes processing all of the packets detected by the network interface device. FIG. 4 shows a timing diagram which illustrates the host device rechecking a network interface device. As shown in FIG. 4, the burst of packets 20 includes a fourth packet 38 while the processing of the fourth packet is represented by a packet processing pulse 40. In addition, the series of packet processing pulses includes a rechecking pulse 42.

As shown in FIG. 4, when the fourth packet 38 has been processed and the interrupt signal $V_{II}$ has been acknowledged, the host device rechecks the network interface device, as shown by the rechecking pulse 42, to insure that no packet goes undetected.

The problem with rechecking the network interface each time the host device completes its processing is that the added step increases the management overhead required. Although the extra overhead depicted by rechecking pulse 42 appears to be a modest tradeoff to insure that packets are not delayed, when a rechecking pulse regularly accompanies the processing of a single packet, the extra overhead quickly becomes significant.

FIG. 5 shows a timing diagram which illustrates the host device rechecking the network interface device, as represented by the rechecking pulse 42, after a single packet 44 has been processed, as represented by a processing pulse 46. As shown in FIG. 5, when the host device is able to process each packet detected by the network interface device before a subsequent packet is detected, the additional overhead is present with each packet processed.

In addition to a process-then-acknowledge many-to-one protocol, which acknowledges the interrupt signal after all of the detected packets have been processed, an acknowledge-then-process many-to-one protocol, which acknowledges the interrupt signal before any packets are processed, can also be utilized. Under an acknowledge-then-process many-to-one protocol, as with the process-then-acknowledge many-to-one protocol, the network interface device detects a packet and then generates the interrupt signal in response.

Upon receiving the interrupt signal, the host device typically acknowledges the interrupt signal, thereby causing the interrupt signal to be deasserted, and then processes all of the packets detected by the network interface device. FIG. 6 shows a timing diagram which illustrates the operation of the host device and the peripheral device under an acknowledge-then-process many-to-one protocol.

The detection of a series of packets is represented in FIG. 6 as a series of packet pulses 52 where the falling edge 54 represents the detection of a complete packet. As with the process-then-acknowledge many-to-one protocol, the network interface device generates the rising edge 56 of the interrupt signal $V_{II}$ in response to the falling edge 54 of a completely detected packet.

The processing of each packet 52 by the host device is represented in FIG. 6 by a series of packet processing pulses 58. As shown in FIG. 6, the host device acknowledges the interrupt signal $V_{II}$ and then processes a detected packet.

The principal disadvantage of the acknowledge-then-process many-to-one protocol is the occurrence of a spurious interrupt condition. A spurious interrupt condition occurs when the network interface device generates an interrupt signal after the host device has acknowledged the interrupt signal but before the host device completes the processing of all of the detected packets. The spurious interrupt causes the host device to attempt to process packets which do not exist.

FIG. 7 shows a timing diagram which illustrates the generation of a spurious interrupt signal. As shown in FIG. 7, the burst of packets 52 are represented by a first packet 62, a second packet 64, and a third packet 66. Further, the processing of the packets are correspondingly represented by a first packet processing pulse 70, a second packet processing pulse 72, and a third packet processing pulse 74. In addition, the spurious interrupt signal is represented by a spurious packet processing pulse 76.

As further shown in FIG. 7, the network interface device generates the rising edge 56 of the interrupt signal $V_{II}$ in response to the falling edge 54 of the first detected packet 62. The host device acknowledges the interrupt signal $V_{II}$ and then begins processing the first packet 62. Before the host device completes the processing of the first packet 62, as shown by the packet processing pulse 70, the network interface device detects the second and the third packets 64 and 66, and reasserts the interrupt signal $V_{II}$.

The host device processes all three of the packets 62, 64, and 66 detected by the network interface device. Since the interrupt signal $V_{II}$ was reasserted when the second packet 64 was detected, the host device reacknowledges the interrupt signal, as shown by the spurious packet processing pulse 76, and then attempts to process packets which do not exist.

One alternative to the acknowledge-then-process many-to-one protocol as described above is to acknowledge the interrupt signal before processing each packet. FIG. 8 shows a timing diagram which illustrates the effect of acknowledging the interrupt signal prior to processing each packet. As shown in FIG. 8, when an acknowledgement signal $V_{AA}$ is generated with the processing of each packet, three acknowledgements are generated when only one is required.

Thus, there is a need for an interrupt-acknowledgement circuit that generates a single interrupt signal when a plurality of events are detected and that allows a host device to process all of the detected events without delayed processing, the generation of spurious signals, or the use of additional overhead such as redundant checks or acknowledgements.

SUMMARY OF THE INVENTION

The present invention provides a peripheral device and a host device that implement a scalar interrupt-acknowledgement system which utilizes counters to count both the number of unprocessed events and the number of processed events, and to both assert and deassert an interrupt signal in response to the values held by the counters. Thus, by maintaining a count of both the number of detected packets and the number of processed packets, delayed notification of packets, redundant checks, spurious interrupts, and redundant acknowledgements can be eliminated.

A peripheral device in accordance with the present invention includes a detector and an unprocessed event counter. The detector detects one or more events and generates a first increment signal in response to each detected event. The unprocessed event counter counts the number of unprocessed events by incrementing an unprocessed count in response to each first increment signal and by decrementing the unprocessed count by the value of a processed count each time an externally-generated processed count word is received where each externally-generated processed count word defines the value of the processed count. The unprocessed event counter also asserts an interrupt signal when the unprocessed count indicates that an event remains unprocessed, such as when the unprocessed count is greater than zero, and deasserts the interrupt signals when the unprocessed count indicates that all of the detected events have been processed, such as when the unprocessed count is equal to zero.

A host device in accordance with the present invention includes a processor and a processed event counter. The processor processes the events detected by an external detector, generates a second increment signal in response to the processing of each detected event, and produces a transmit signal each time a number of the detected events are processed. The processed event counter counts the number of processed events by incrementing a processed count value in response to each second increment signal, transmits a processed count word which represents the processed count in response to the transmit signal, and resets the processed count in response to the transmission of each processed count word.

The unprocessed event counter can include, for example, a memory that stores the processed count, as transmitted by each processed count word, and the unprocessed count. An adder/subtractor adds a count to the unprocessed count in response to each first increment signal, and subtracts the processed count from the unprocessed count each time the unprocessed count word is received. A comparator asserts the interrupt signal when the unprocessed count indicates that detected events remain unprocessed, and deasserts the interrupt signal when the unprocessed count indicates that all detected events have been processed. In addition, the processor may, for example, generate the second increment signal before or after each event is processed.

A better understanding of the features and advantages of the present invention will be obtained by reference to the following detailed description and accompanying drawings which set forth an illustrative embodiment in which the principles of the invention are utilized.

BRIEF DESCRIPTION OF THE DRAWINGS

FIG. 11 is a block diagram illustrating how the bits of RAM 210 which correspond to the unprocessed count can be connected to comparator 214 to detect the zero and non-zero condition when RAM 210 is written to or read from.

DETAILED DESCRIPTION

Figure 1:
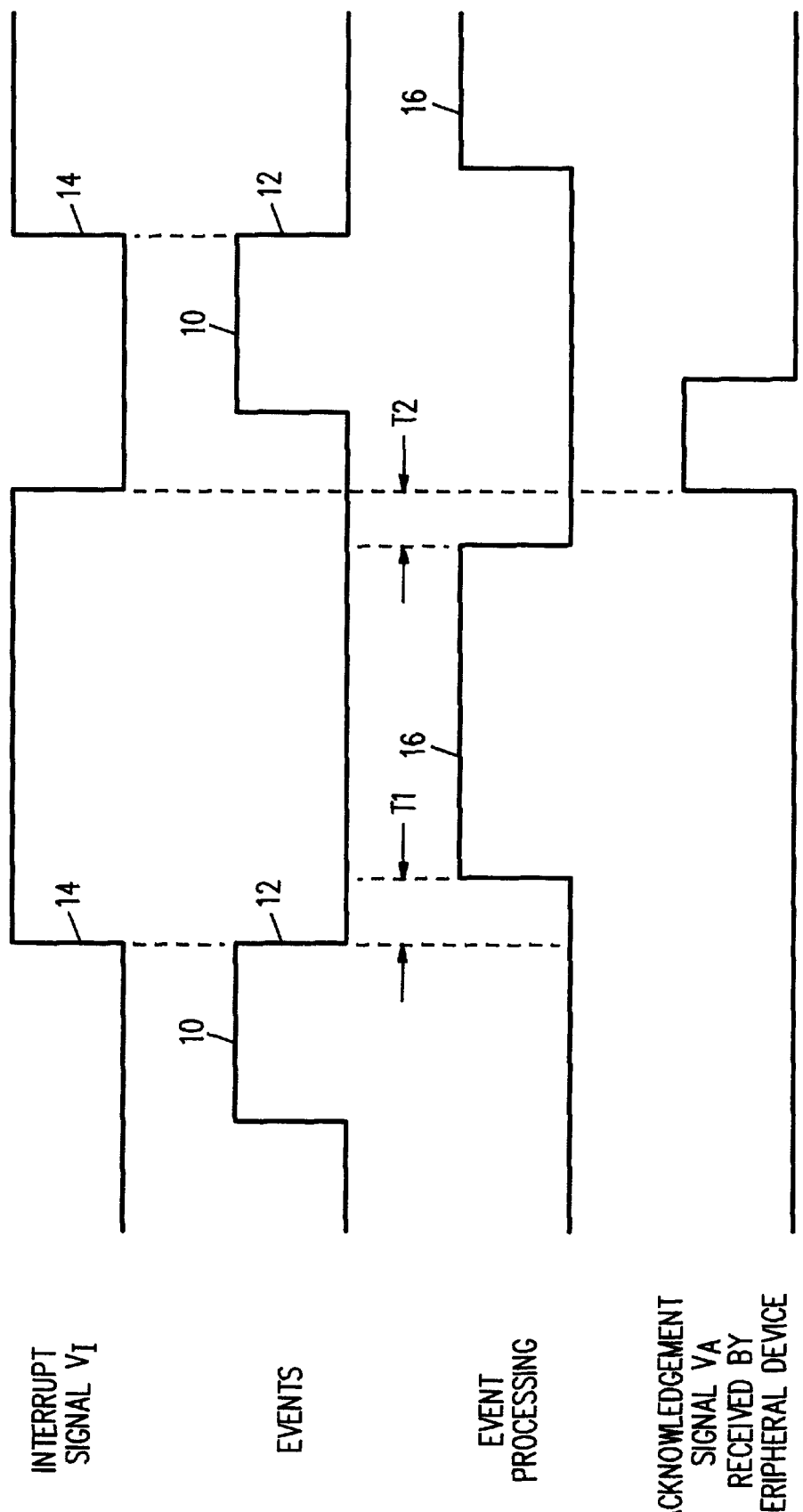
FIG. 1 is a timing diagram illustrating the operation of the host device and the peripheral device under a simple interrupt-acknowledgement protocol.
Figure 2:
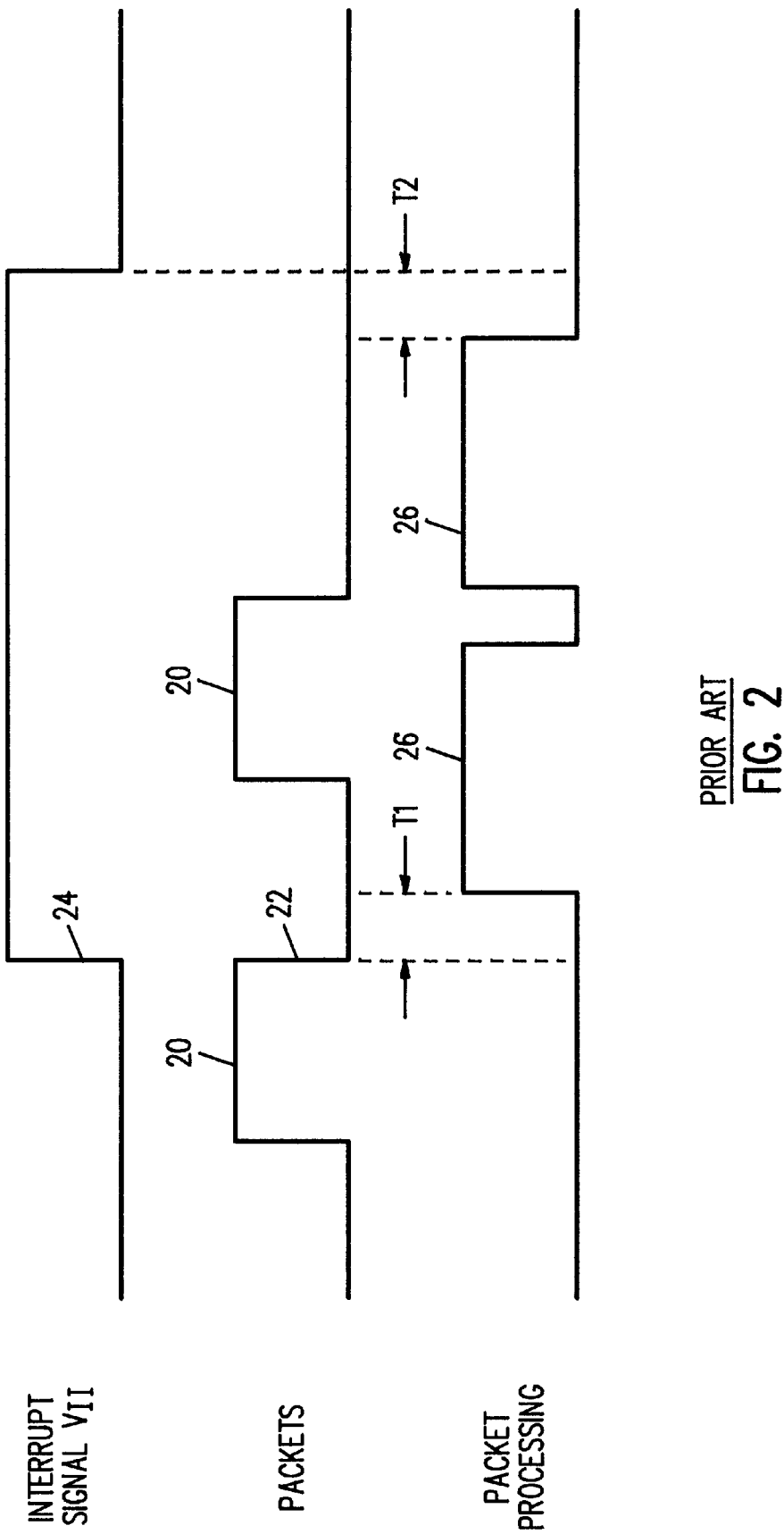
FIG. 2 is a timing diagram illustrating the operation of the host device and the network interface device under a process-then-acknowledge many-to-one protocol.
Figure 3:
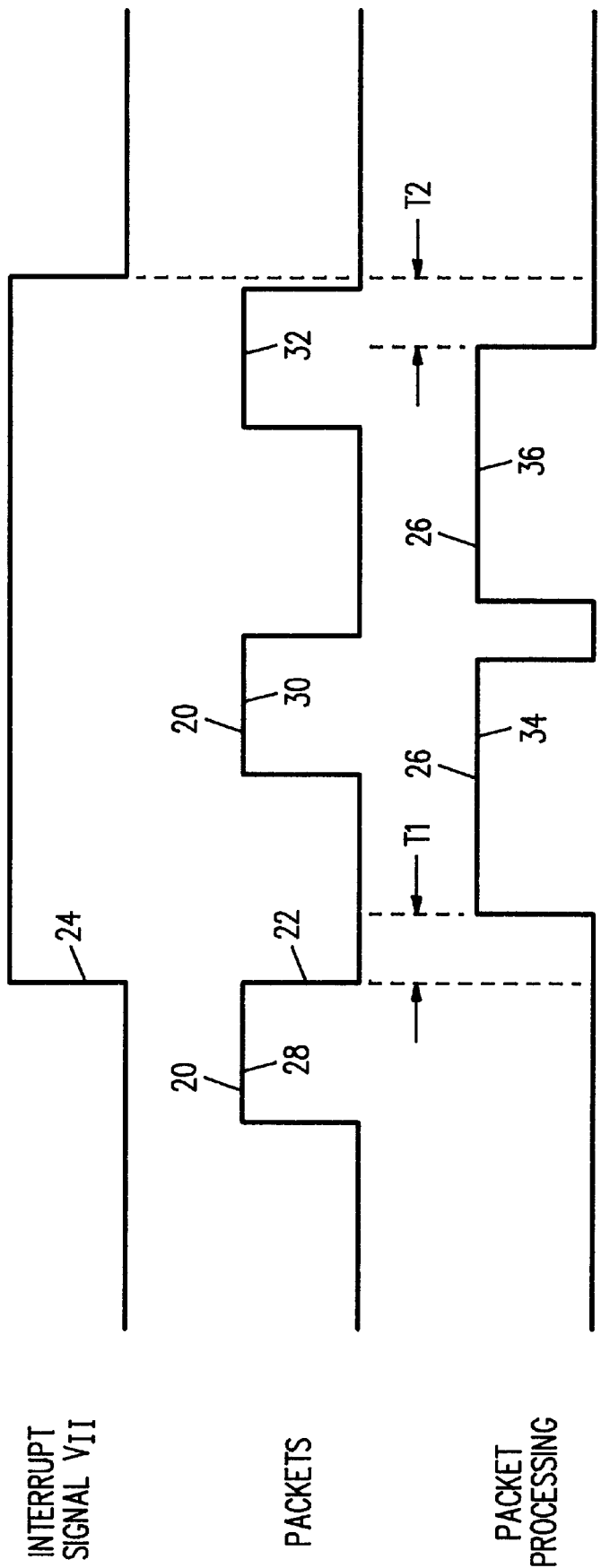
FIG. 3 is a timing diagram illustrating a delayed notification from the network interface device to the host device under a process-then-acknowledge many-to-one protocol.
Figure 4:
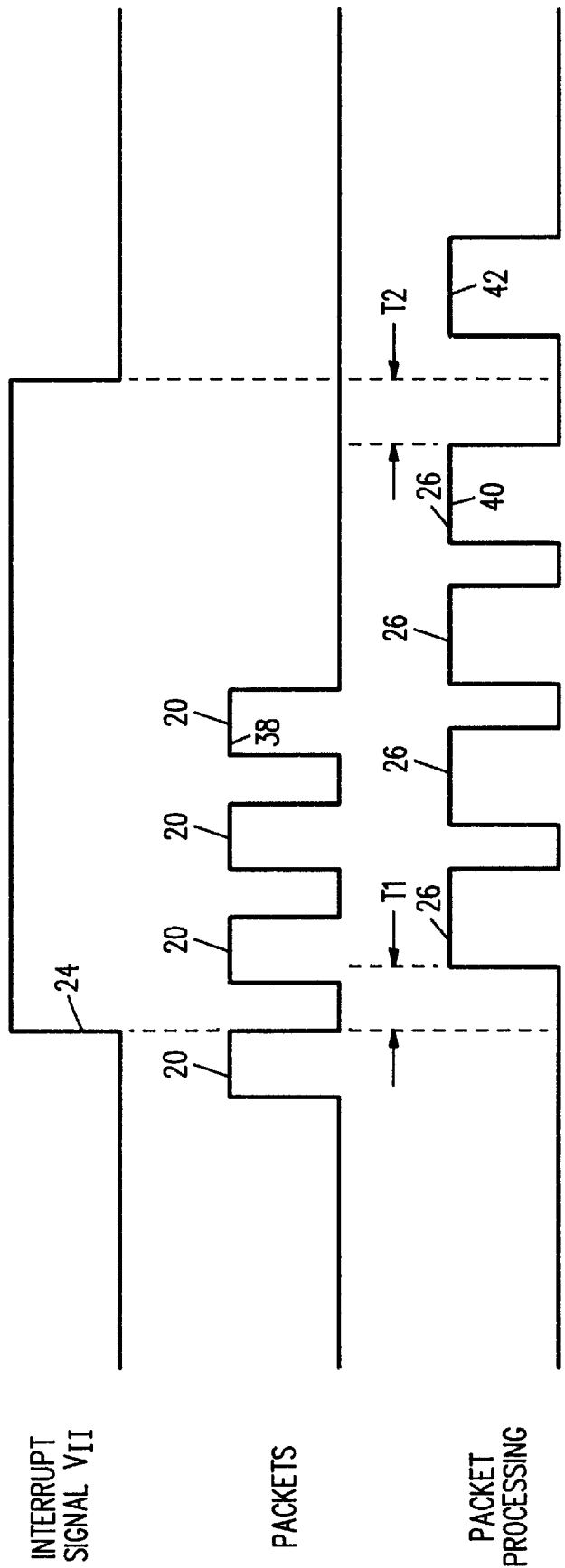
FIG. 4 is a timing diagram illustrating the host device rechecking a network interface device.
Figure 5:
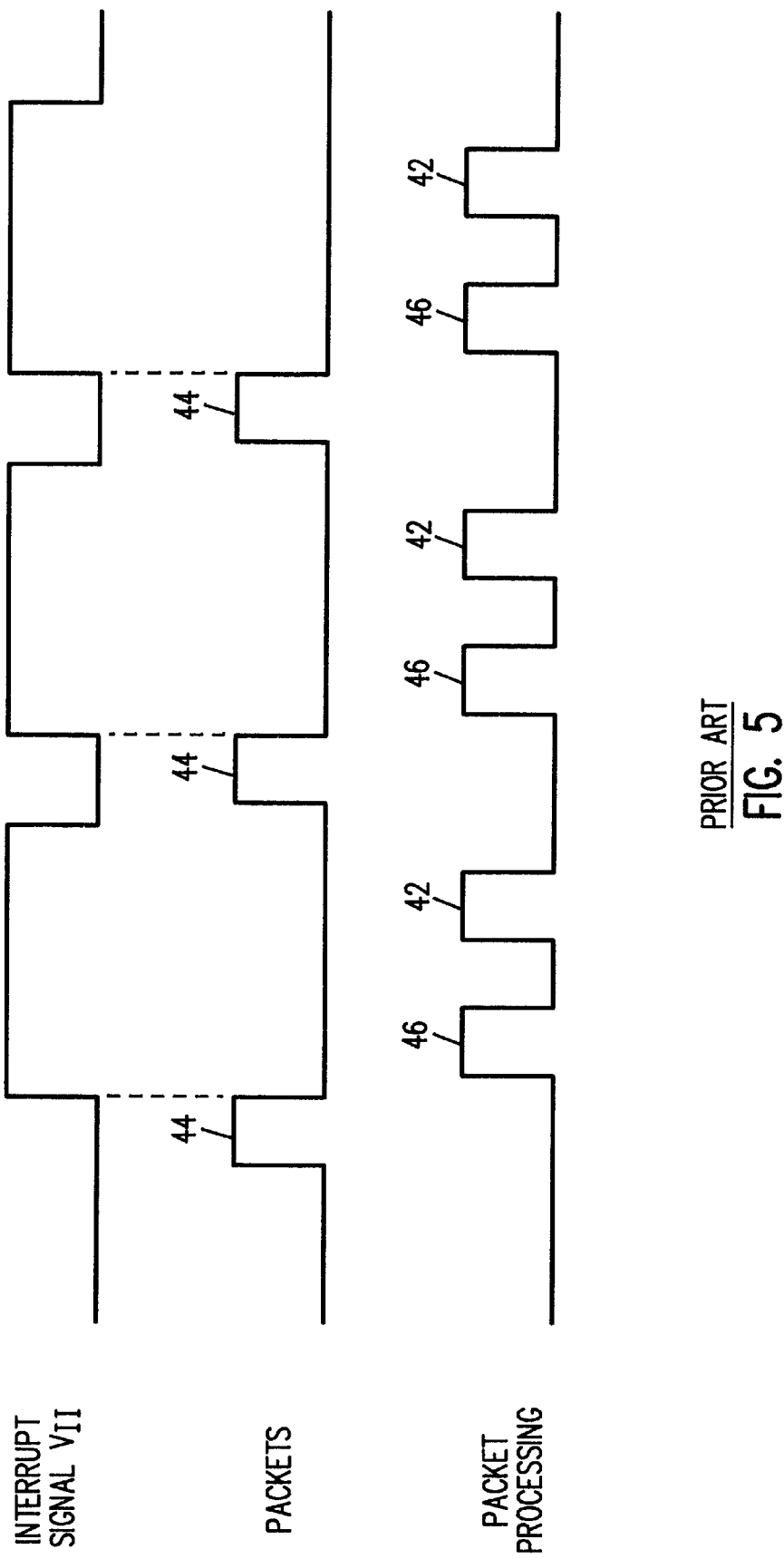
FIG. 5 is a timing diagram illustrating the host device rechecking the network interface device, as represented by the rechecking pulse 42, after a single packet 44 has been processed, as represented by a processing pulse 46.
Figure 6:
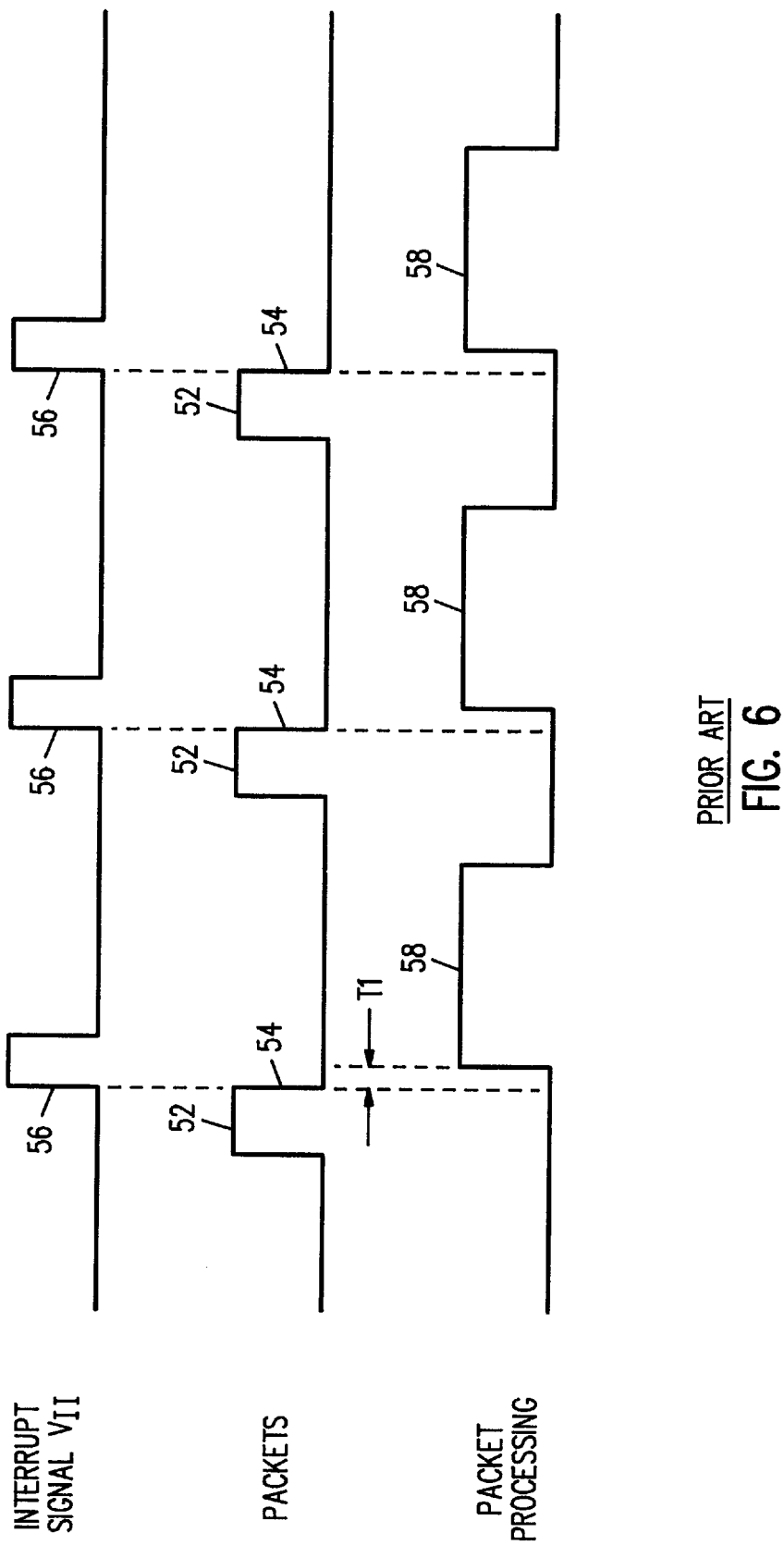
FIG. 6 is a timing diagram illustrating the operation of the host device and the peripheral device under an acknowledge-then-process many-to-one protocol.
Figure 7:
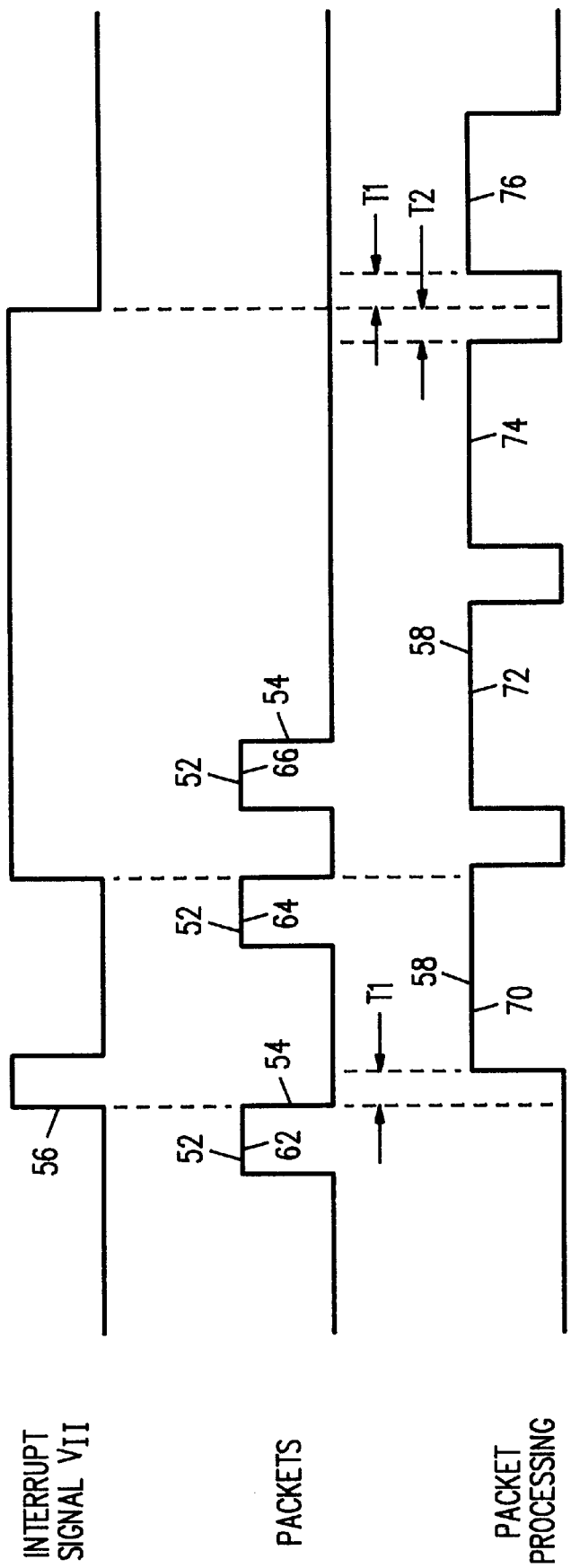
FIG. 7 is a timing diagram illustrating the generation of a spurious interrupt signal.
Figure 8:
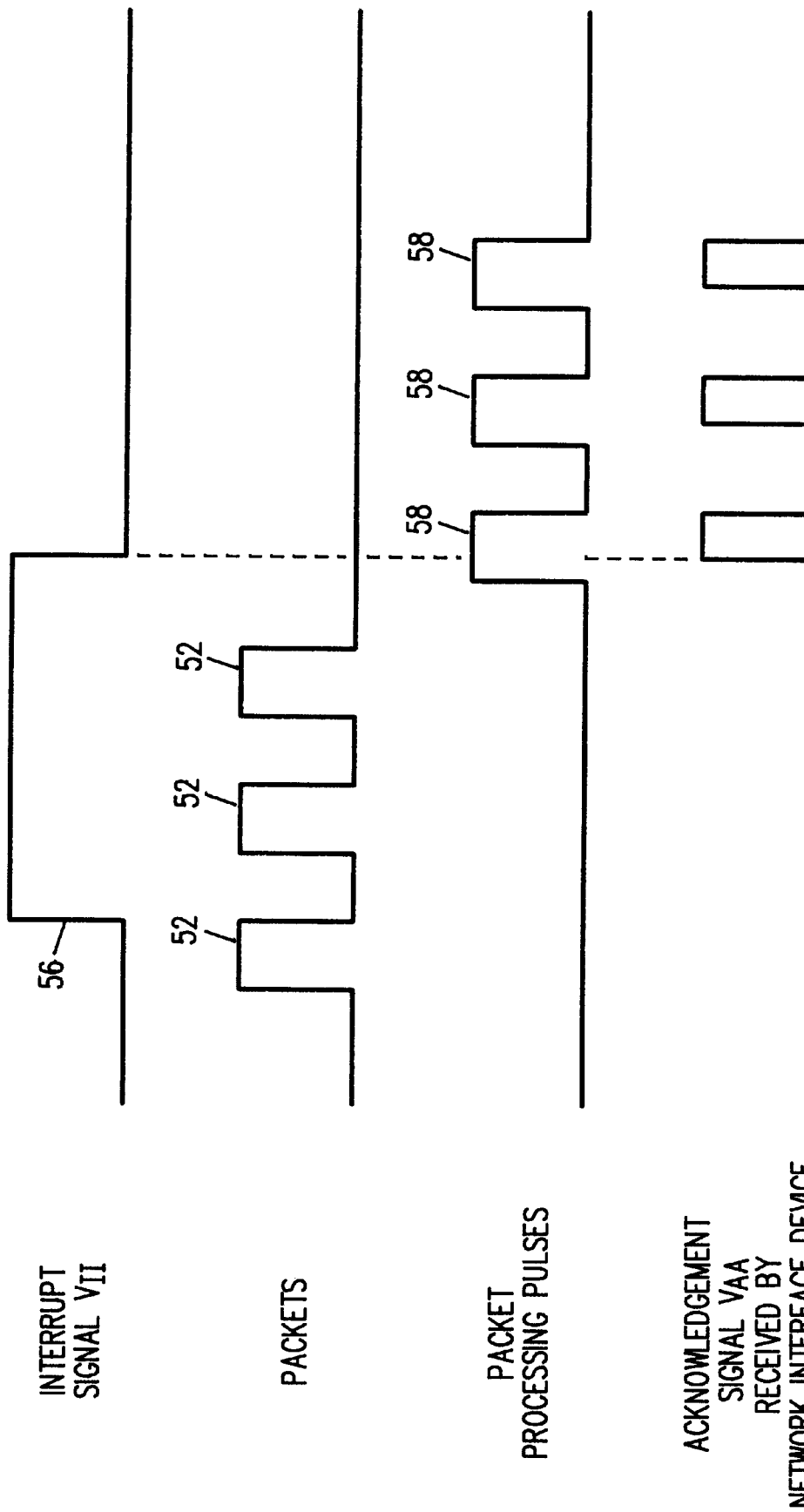
FIG. 8 is a timing diagram illustrating the effect of acknowledging the interrupt signal prior to processing each packet.
Figure 9:
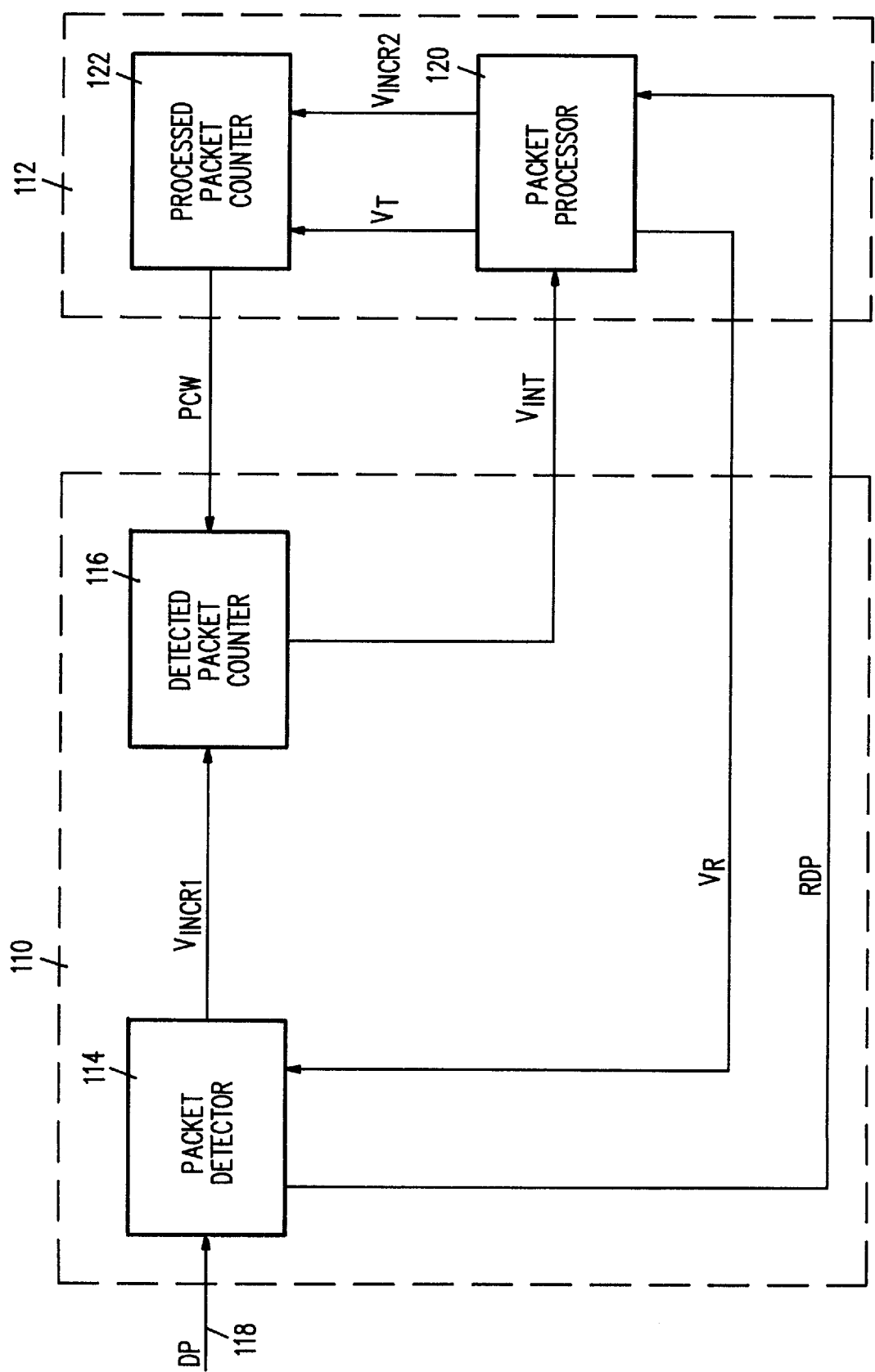
FIG. 9 is a block diagram illustrating a network interface device and a host device which implement a scalar interrupt-acknowledgement system in accordance with the present invention.

FIG. 9 shows a block diagram of a network interface device 110 and a host device 112 that implement a scalar interrupt-acknowledgement system in accordance with the present invention. As described in greater detail below, the scalar interrupt-acknowledgement system utilizes counter circuitry to count both the number of detected packets and the number of processed packets, and to both assert and deassert an interrupt signal in response to the values held by the counter circuitry.

As shown in FIG. 9, network interface device 110 includes a packet detector 114 and a detected packet counter 116. Network interface device 110 detects data packets DP transmitted to network interface device 110 across an external bus 118, generates an increment signal $V_{INCR1}$ in response to each detected data packet DP, stores the detected data packets DP for retransmission, and retransmits the stored data packets as received data packets RDP in response to a request signal $V_R$.

The detected packet counter 116 counts the number of unprocessed packets by incrementing an unprocessed count in response to each increment signal $V_{INCR1}$, and by decrementing the unprocessed count by the value of a processed count each time an externally-generated processed count word PCW is received where each externally-generated processed count word PCW defines the value of the processed count.

Detected packet counter 116 also asserts an interrupt signal $V_{INT}$ when the unprocessed count is greater than zero, and deasserts the interrupt signal $V_{INT}$ when the unprocessed count is equal to zero. Alternately, other counting schemes can also be used.

Referring again to FIG. 9, host device 112 includes a packet processor 120 and a processed packet counter 122. Processor 120 generates the request signal $V_R$ in response to the interrupt signal $V_{INT}$, receives and processes the received data packets RDP retransmitted by packet detector 114, and generates an increment signal $V_{INCR2}$ in response to the processing of each detected packet. In the present invention, packet processor 120 can generate the increment signal $V_{INCR2}$ either before or after the processing of each packet.

The packet processor 120 also generates a transmit signal $V_T$ when the processing of a number of the received data packets RDP has been completed. For example, the packet processor 120 could generate the transmit signal $V_T$ following the processing of every nth received data packet RDP or when the processing of all the received data packets RDP have been processed.

As further shown in FIG. 9, processed packet counter 122 counts the number of processed packets by incrementing a processed count in response to each increment signal $V_{INCR2}$, transmits the processed count as the processed count word PCW in response to the transmit signal $V_T$, and resets the processed count in response to the transmission of each processed count word PCW.

Thus, by incrementing a counter each time a packet is detected and by decrementing the counter once for each packet that has been processed, network interface device 110 and host device 112 are able to accurately track the number of remaining or unprocessed packets.

In the preferred embodiment of the present invention, network interface device 110 and host device 112 transmit and receive the processed count word PCW, the interrupt signal $V_{INT}$, the request signal $V_R$, and the received data packets RDP across a shared bus.

In operation, network interface device 110 asserts the interrupt signal $V_{INT}$ after the first packet is detected and counted, and then continues to count each subsequently detected packet. Host device 112 asynchronously processes and counts each packet detected by network interface device 110.

To acknowledge the interrupt signal $V_{INT}$, host device 112 writes the processed count back to network interface device 110 as the processed count word PCW. Network interface device 110 then subtracts the processed count from the unprocessed count to determine whether the interrupt signal $V_{INT}$ should be deasserted. Thus, when the transmit signal is generated after all of the packets have been processed, host device 112 need make only a single access across the shared bus to acknowledge the interrupt signal $V_{INT}$. Since both network interface device 110 and host device 112 maintain a count of the number of packets detected and processed, the delayed notification and spurious interrupt conditions cannot arise.

When a network interface device is only accessible across a shared bus, such as an IBM MICRO CHANNEL™ bus, the present invention provides a substantial increase in performance. On an IBM microchannel bus, each bus master may retain the bus up to 7.8 microseconds. With five bus masters, it can take up to 39 microseconds before the host device can access the network interface device. Since the scalar interrupt-acknowledgement system maintains a count of both the unprocessed and processed packets, less bus time is required.

Figure 10:
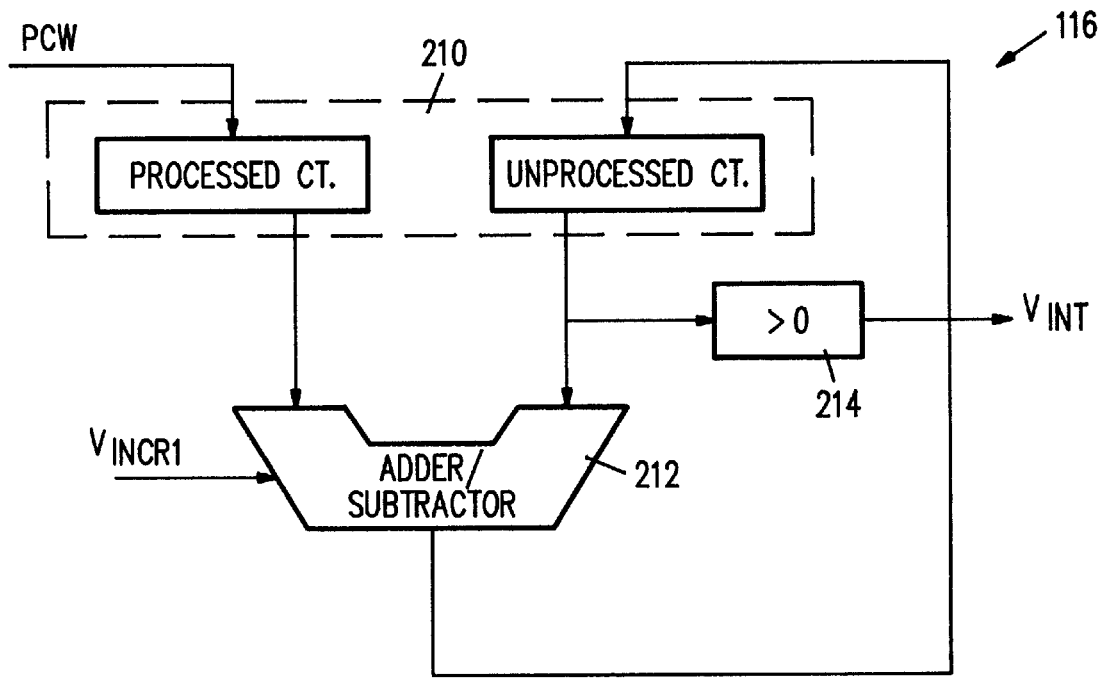
FIG. 10 is a block diagram illustrating an embodiment of detected packet counter 118.

FIG. 10 shows a block diagram of an embodiment of detected packet counter 116. As shown in FIG. 10, detected packet counter 116 can be implemented using a random access memory (RAM) 210, an adder/subtractor 212, and a comparator 214. In operation, RAM 210 stores the processed count, as transmitted by the processed count word PCW, and the unprocessed count. Adder/subtractor 212 adds a count to the unprocessed count in response to each increment signal $V_{INCR1}$ and subtracts the processed count from the unprocessed count each time the processed count word PCW is received. Comparator 214 asserts the interrupt signal $V_{INT}$ when the unprocessed count is greater than zero and deasserts the interrupt signal $V_{INT}$ when the unprocessed count is equal to zero.

Figure 11:
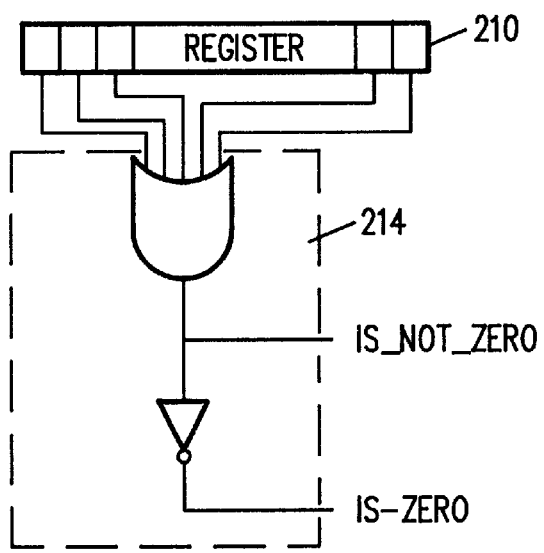

When detected packet counter 116 is implemented with RAM as described above, the detection of the zero and non-zero condition can be accomplished when reading or writing to the counter RAM location. FIG. 11 shows a block diagram which illustrates how the bits of RAM 210 which correspond to the unprocessed count can be connected to comparator 214 to detect the zero and non-zero condition when RAM 210 is written to or read from.

It should be understood that various alternatives to the structures described herein may be employed in practicing the present invention. For example, rather than continually subtracting the processed count from the unprocessed count, a simple comparison can be made between the processed count and the unprocessed count. The comparison can then be use to assert an interrupt signal when the result indicates that an event remains unprocessed, and to deassert the interrupt signal when the result indicates that all of the detected events have been processed.

In addition, although the invention has been described in relation to a the communication between a network interface device and a host device, the present invention is equally applicable to other interrupt-acknowledgement applications. Thus, it is intended that the following claims define the invention and the structures within the scope of these claims and their equivalents be covered thereby.

What is claimed is:

1. A peripheral device for implementing a scalar interrupt-acknowledgement system that utilizes a single interrupt indication when one or more events are detected, the peripheral device comprising:
    a detector that detects said one or more events and that generates a plurality of increment signals by generating an increment signal in response to each detected event; and
    an unprocessed event counter that counts unprocessed events by incrementing an unprocessed count in response to each increment signal, and by decrementing the unprocessed count by a value of a processed count each time a processed count word is received where each processed count word defines the processed count, that asserts an interrupt signal when the unprocessed count indicates that an event remains unprocessed, and that deasserts the interrupt signal when the unprocessed count indicates that all of the detected events have been processed.

2. A peripheral device for implementing a scalar interrupt-acknowledgement system that utilizes a single interrupt indication when one or more events are detected, the peripheral device comprising:
    a detector that detects said one or more events and that generates a plurality of increment signals by generating an increment signal in response to each detected event; and
    an unprocessed event counter that counts unprocessed events by incrementing an unprocessed count in response to each increment signal, and by decrementing the unprocessed count by a value of a processed count each time a processed count word is received where each processed count word defines the processed count, that asserts an interrupt signal when the unprocessed count indicates that an event remains unprocessed, and that deasserts the interrupt signal when the unprocessed count indicates that all of the detected events have been processed,
    wherein the unprocessed event counter comprises:
        a memory that stores the processed count, as transmitted by the processed count word, and the unprocessed count;
        an adder/subtractor that adds a count to the unprocessed count in response to each increment signal and that subtracts the processed count from the unprocessed count each time the processed count word is received; and
        a comparator that asserts the interrupt signal when the unprocessed count indicates that detected events remain unprocessed and that deasserts the interrupt signal when the unprocessed count indicates that all detected events have been processed.

3. The device of claim 2 wherein the comparator asserts the interrupt signal when the unprocessed count is greater than zero and deasserts the interrupt signal when the unprocessed count is equal to zero.

4. A host device for implementing a scalar interrupt-acknowledgement system that utilizes a single interrupt signal when a plurality of events are detected, the host device comprising:
    a processor that processes the events detected by an external detector, that generates a plurality of increment signals by generating an increment signal in response to the processing of each detected event, and that generates a plurality of transmit signals by generating a transmit signal each time a number of the detected events are processed; and
    a processed event counter that counts a number of processed events by incrementing a processed count in response to each increment signal, that transmits a plurality of processed count words by transmitting a processed count word which represents the processed count in response to each transmit signal, and that resets the processed count in response to the transmission of each processed count word.

5. The device of claim 4 wherein the processor generates the increment signal after each event is processed.

6. The device of claim 4 wherein the processor generates the increment signal before each event is processed.

7. The device of claim 4 wherein the processor generates the transmit signal during the processing of the detected events.

8. The device of claim 4 wherein the transmit signal is generated when all of the detected events are processed.

9. A scalar interrupt-acknowledgement circuit for generating a single interrupt indication when one or more events are detected, the scalar interrupt-acknowledgement circuit comprising:

a detector that detects said one or more events and that generates a plurality of first increment signals by generating a first increment signal in response to each detected event;

a processor that processes the events detected by the detector, that generates a plurality of second increment signals by generating a second increment signal in response to the processing of each detected event, and that generates a plurality of transmit signals by generating a transmit signal when a number of detected events are processed;

a processed event counter that counts a number of processed events by incrementing a processed count in response to each second increment signal, that transmits a plurality of processed count words by transmitting a processed count word which represents the processed count in response to each transmit signal, and that resets the processed count in response to the transmission of each processed count word; and an unprocessed event counter that counts a number of unprocessed events by incrementing an unprocessed count in response to each first increment signal and by decrementing the unprocessed count by the processed count, as represented by each processed count word, in response to a receipt of each processed count word, that asserts an interrupt signal when the unprocessed count indicates that an event remains unprocessed, and that deasserts the interrupt signal when the unprocessed count indicates that all of the detected events have been processed.

10. The circuit of claim 9 wherein the processor generates the second increment signal after each event is processed.

11. The circuit of claim 9 wherein the processor generates the second increment signal before each event is processed.

12. The circuit of claim 9 wherein the unprocessed event counter comprises:

a memory that stores the processed count as transmitted by the processed count word, and the unprocessed count;

an adder/subtractor that adds a count to the unprocessed count in response to each first increment signal and that subtracts the processed count from the unprocessed count in response to the receipt of each processed count word; and a comparator that asserts the interrupt signal when the unprocessed count indicates that detected events remain unprocessed and that deasserts the interrupt signal when the unprocessed count indicates that all detected events have been processed.

13. The circuit of claim 12 wherein the comparator asserts the interrupt signal when the unprocessed count is greater than zero and deasserts the interrupt signal when the unprocessed count is equal to zero.

14. The circuit of claim 9 wherein the processor generates the transmit signal during the processing of the detected events.

15. A scalar interrupt-acknowledgement circuit for generating a single interrupt indication when one or more events are detected, the scalar interrupt-acknowledgement circuit comprising:

detector means for detecting said one or more events;

processor means for processing the events detected by the detector means;

processed event counter means for counting a number of events processed by the processor means;

unprocessed event counter means for counting a number of events detected by the detector means; and comparator means for comparing the number of events counted by the unprocessed event counter means and the number of processed events counted by the processed event counter means, for asserting an interrupt signal when a comparison indicates that an event remains unprocessed, and for deasserting the interrupt signal when the comparison indicates that all of the detected events have been processed.

16. A method for generating a single interrupt indication when one or more events are detected, the method comprising the steps of:

detecting said one or more events and generating a plurality of first increment signals by generating a first increment signal in response to each detected event;

processing the detected events, generating a plurality of second increment signals by generating a second increment signal in response to the processing of each detected event, and generating a plurality of transmit signals by generating a transmit signal when a number of detected events are processed;

counting a number of processed events by incrementing a processed count in response to each second increment signal, transmitting a plurality of processed count words by transmitting a processed count word which represents the processed count in response to each transmit signal, and resetting the processed count in response to the transmission of each processed count word; and counting unprocessed events by incrementing an unprocessed count in response to each first increment signal and by decrementing the unprocessed count by the processed count, as represented by each processed count word, in response to a receipt of each processed count word, asserting an interrupt signal when the unprocessed count indicates that an event remains unprocessed, and deasserting the interrupt signal when the unprocessed count indicates that all of the detected events have been processed.

* * * * *